(12) United States Patent
Tabe (10) Patent No.: US 8,814,208 B2
(45) Date of Patent: Aug. 26, 2014

(54) ADVANCED WEIGHT RESPONSIVE SUPPLEMENTAL RESTRAINT COMPUTER SYSTEM

(76) Inventor: Joseph Tabe, Silver Spring, MD (US)

(*) Notice: Subject to any disclaimer, the term of this patent is extended or adjusted under 35 U.S.C. 154(b) by 0 days.

(21) Appl. No.: 11/670,057

(22) Filed: Apr. 18, 2007

(65) Prior Publication Data

US 2007/0182139 A1    Aug. 9, 2007

Related U.S. Application Data

(63) Continuation-in-part of application No. 10/680,826, filed on Oct. 7, 2003.

(51) Int. Cl.
*B60R 21/16* (2006.01)

(52) U.S. Cl.
USPC .......................................... 280/735; 280/734

(58) Field of Classification Search
USPC .......................................................... 280/735
See application file for complete search history.

(56) References Cited

U.S. PATENT DOCUMENTS

| | | | |
|---|---|---|---|
| 3,861,710 A * | 1/1975 | Okubo ........................ | 280/735 |
| 4,806,713 A | 2/1989 | Krug et al. | |
| 5,071,160 A | 12/1991 | White et al. | |
| 5,161,820 A | 11/1992 | Vollmer | |
| 5,232,243 A * | 8/1993 | Blackburn et al. ........... | 280/732 |
| 5,413,378 A * | 5/1995 | Steffens et al. ............... | 280/735 |
| 5,605,348 A * | 2/1997 | Blackburn et al. ........... | 280/735 |
| 5,707,078 A * | 1/1998 | Swanberg et al. ........... | 280/739 |
| 6,039,344 A * | 3/2000 | Mehney et al. .............. | 280/735 |
| 6,069,325 A * | 5/2000 | Aoki ............................ | 177/136 |
| 6,092,838 A * | 7/2000 | Walker ......................... | 280/735 |
| 6,231,076 B1 * | 5/2001 | Blakesley et al. ............ | 280/735 |
| 6,324,453 B1 * | 11/2001 | Breed et al. .................... | 701/45 |
| 6,364,352 B1 * | 4/2002 | Norton ......................... | 280/735 |
| 6,397,688 B1 * | 6/2002 | Sakamoto et al. ....... | 73/862.637 |
| 6,922,622 B2 * | 7/2005 | Dulin et al. .................... | 701/45 |
| 2004/0135354 A1 * | 7/2004 | Kishimoto et al. .......... | 280/735 |
| 2004/0145165 A1 * | 7/2004 | Nagai et al. .................. | 280/735 |
| 2005/0230946 A1 * | 10/2005 | Takashima ................... | 280/735 |

* cited by examiner

*Primary Examiner* — Paul N Dickson
*Assistant Examiner* — Barry Gooden, Jr.
(74) *Attorney, Agent, or Firm* — Joseph Tabe (57) ABSTRACT

An advanced weight responsive supplemental restraint computer system that minimizes both actual and perceived dangers related to the deployment of vehicle air bag systems by distinguishing between the varying size and weight of a passenger and also sensing the imminence of a collision in order to cater the air bag deployment to the unique physical attributes of the passenger.

16 Claims, 5 Drawing Sheets

ADVANCED WEIGHT RESPONSIVE SUPPLEMENTAL RESTRAINT COMPUTER SYSTEM

This Application is a Continuation-In-Part of application Ser. No. 10/680,826, filed on Oct. 7, 2003.

FIELD OF THE INVENTION

The present invention relates generally to passenger vehicle supplemental restraint systems, commonly known as air bags. More specifically, the present invention relates to a supplemental restraint system that detects the weight of a passenger in a motor vehicle and alters the air bag response in the event of a collision based upon the weight of the passenger.

BACKGROUND OF THE INVENTION

The advantages of the supplemental restraint system, in passenger vehicles, in combination with the use of seat belts have been well appreciated. Air bags are among the most successful safety devices in motor vehicles today. The use of air bags in modern vehicles is fast becoming an absolute standard.

Recently, however, a problem has arisen which presents both real and perceived hazards in the use of air bags. Air bags are primarily designed for the benefit of adult passengers. When children or infants are placed in the front passenger seat, deployment of an air bag can and has caused serious injury. Automobile manufacturers, realizing this hazard, have recommended that children and infants only ride in the rear passenger seats of an automobile.

According to the National Highway Transportation Safety Board, "smart" technology air bags should be in place starting with motor vehicles built in 1999. In short, "smart technology" air bags adjust air bag deployment to accommodate the specific weight considerations of the passenger who would be affected by its deployment. The result is that small passengers are less often injured by the deployment of airbags.

While air bags have been credited with saving thousands of lives, the tremendous force of air bag deployment has also caused many injuries. Air bags have been blamed for deaths of many children and adults in low-speed accidents that otherwise would have been non-fatal.

Placing infants and small individuals in the front passenger seat of automobiles has led to some serious, but avoidable, tragedies. Unfortunately these accidents have had a secondary effect in that the public is beginning to perceive air bags as inherently dangerous and has begun to believe that they should be selectively disabled, if installed at all. In light of the statistics, however, airbags have resulted in a net increase in lives saved. Therefore, measures short of disabling or not installing air bags are needed.

Inevitably, children will be placed in the front passenger seats of automobiles, whether due to ignorance of the hazards or simply due to the need to fit a certain number of passengers in a particular vehicle. Therefore, the solution lies in adapting the supplemental restraint system to adjust the deployment force of airbags to compensate for the presence of smaller passengers. It should also be noted that, while less likely, smaller adults also may be injured by the deployment of an air bag. The most obvious solution to the problem, which is popular with the public, is to provide for the disabling of the air bag. This solution has several problems. First, the operator may forget to disable the air bag when it should be disabled. Second, the operator may forget to enable the system when its protection is desired. Finally, entirely disabling the system deprives children and smaller passengers of the benefits of air bags.

In order to avoid some of the above problems, related prior art has incorporated measurement systems into the seats of some vehicles to gather information about the passenger and to operate the air bag in accordance with that information. These systems generally represent a simple "on" or "off" selection. For example, if a passenger is not located in the seat, or does not trigger certain secondary detectors, the restraint system may be disabled. If the detector properly senses a passenger in the vehicle, the air bag is simply enabled.

U.S. Pat. No. 4,806,713, issued Feb. 21, 1989, to Krug et al., which shows a seat contact switch for generating a "seat occupied" signal when an individual is sensed atop a seat. The Krug et al. device does not have the ability to measure the weight of the seated individual.

U.S. Pat. No. 5,071,160, issued Dec. 10, 1991, to White et al., provides the next iteration of this type of system. A weight sensor in the seat, in combination with movement detectors, determines if it is necessary to deploy an air bag. If an air bag is deployed, the weight sensor determines what level of protection is needed and a choice is made between deploying one or two canisters of propellant. Unlike the present invention, White's invention is incapable of an air bag response tailored to an individual passenger. White's system only is capable of a high or low power air bag deployment.

U.S. Pat. No. 5,161,820, issued Nov. 10, 1992, to Vollmer, describes a control unit for the intelligent triggering of the propellant charge for the air bag when a triggering event is detected. Vollmer's device provides a multiplicity of sensors located around a passenger seat so as to sense the presence or absence of a sitting, standing, or kneeling passenger. The Vollmer device is incapable of sensing the weight of passengers and deploying the air bag with force corresponding to a passengers weight.

SUMMARY OF THE INVENTION

Definitions

Strain gage: An electrical resistance element exhibits a varying electrical resistance as it is deformed. The strain gauge is affixed to steel beams of a load cell.

Load cell: At least one strain gage bonded to the surface of the machined high-strength steel beams. A sensing device houses an electrical resistance element that transforms deformations in the load cell into an electrical resistance.

Specialized arrays: help to manage the flow of data about a vehicle's occupants and the vehicle's acceleration to a computer's memory.

This improvement for the instant invention is based on the same concept as the provisional application Ser. No. 60/079,496 filed on 26 Mar. 1998 and of PCT Application No. PCT/US99/06666.

The present invention is designed to deploy an air bag intelligently through the use of weight sensors. There are two major points of concern relative to safe air bag deployment. First, the passenger's weight must be determined accurately. Second, once an accurate measure of the passenger's weight has been ascertained, air bag deployment must be controlled to apply an amount of force appropriate for protecting the passenger.

The present invention monitors the weight of a seated occupant both initially when the vehicle is started, and then the present invention is capable of recognizing a change in passenger weight. A load cell underneath the seat senses the weight of a passenger at regular intervals. The load cell accurately determines passenger weight. A control module decides which airbag(s), if any, should be deployed and precisely controls the deployment force of the airbag in response to the passenger's weight and the severity of the crash. An Erasable Programmable Read Only Memory—EPROM controls information about different occupants at the address line. Thus, vibrations caused by bumps do not disturb occupants' weight information at the address line.

The address line, which is a referenced storage memory that stores the occupant's actual weight at the initial sitting, does not allow data changes due to vibration or occupant movement on the seat. Once the weight is referenced to the address line, it will be protected from shocks and vibrations, and also prevent data changes when the occupant moves in the seat. Even if the occupant's body moves while the vehicle is in motion, the EPROM will only replace the address line information when the occupant completely leaves the seat. Drivers can verify or check the airbag's functionality by simply pushing in on a check button switch.

The occupant's weight information from the load cell, which is communicatively configured with the accelerometer, enables the airbag to deploy with a force that is dependent on the occupant's weight, while the activation of the collision sensor is dependent on the crash severity. The system's intelligence is unique and deployment is smart. The collision sensor is activated only when a collision force capable of causing injuries is sensed. The deployment force of the airbag is controlled by the occupant's weight. The deployment acceleration of the airbag is directly proportional to the weight of the occupant. The detection of a rear end collision and timely deployment of an airbag in response is also controlled by the system.

The software is programmed to communicate with the driver to further prevent vehicle passengers from sitting in inappropriate locations. For example, the system will communicate to the driver that a person in the front passenger seat is too small to be safely seated there if such a person is detected.

The amount of released gas, when ignited by the gas igniter, will deploy the air bag at a speed and force that are proportional to the occupant's weight, without causing any further injury. Processors are configured to locate the passenger's weight information, process the information in less than a millisecond, and signal to the accelerometer to generate a controlled energy that will determine the exact acceleration output needed to influence deployment of the air bag when the collision sensor senses a collision of a prescribed magnitude. All the operations of the processors are done by signals, turning on or off different combinations of transistorized switches. The processors will handle an arithmetic logic unit that handles all the data manipulations.

Accordingly, it is a principal object of the present invention to provide a supplemental restraint system having an accurate weight sensor to determine the presence and weight of a passenger.

It is another object of the present invention to provide a correlation between the weight of the passenger and the deployment characteristics of the air bag.

It is a further object of the present invention to provide an air bag deployment system, which is infinitely variable between an upper and lower threshold, to correlate the force of the air bag to the force of a moving passenger.

Still another object of the present invention is to prevent the deployment of an air bag when no passenger is present.

Yet another object of the present invention is to provide a mechanism to detect the imminence of a rear impact and to timely deploy an air bag in response thereto.

It is another object of the present invention to provide improved elements and arrangements thereof in an apparatus for controlling airbag deployment that is inexpensive, dependable and fully effective in accomplishing its intended purposes.

These and other objects of the present invention will readily become apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 4:
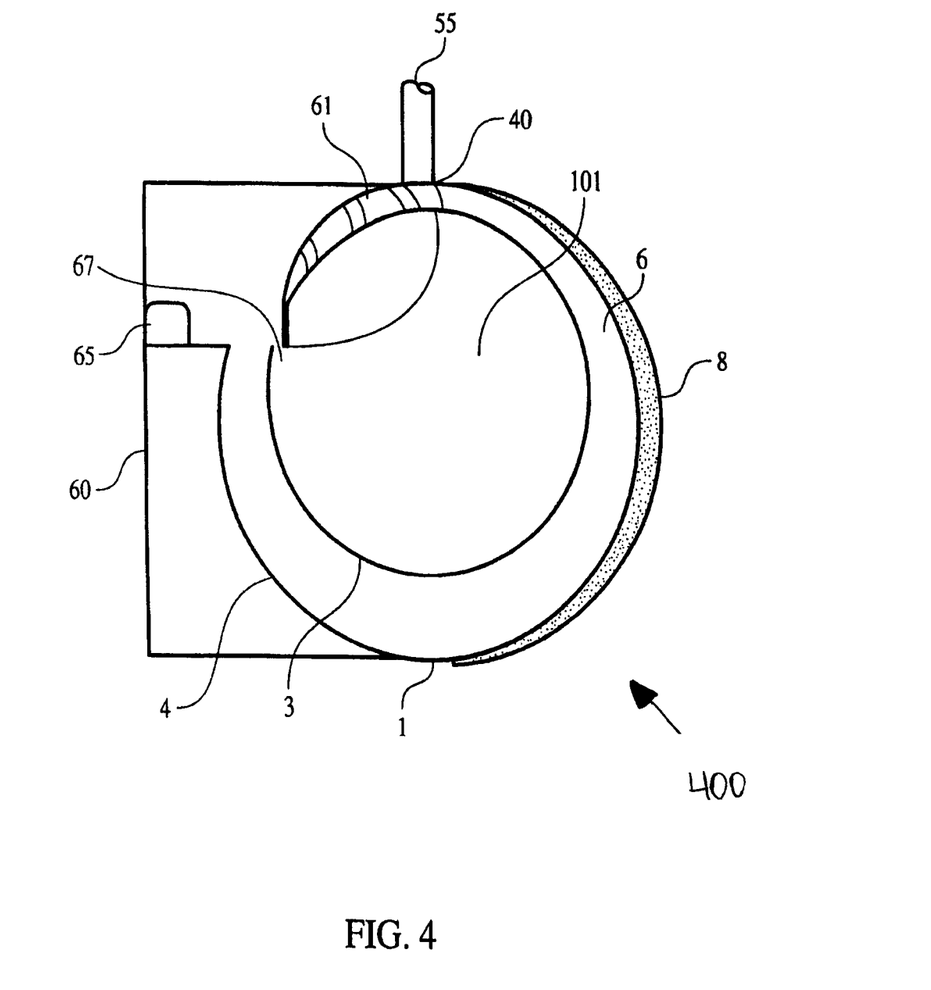
FIG. 4 shows the gas canister (60), the sliding pot (61), the external layer (4), the internal layer (3), the sliding port opening (67) for the release of igniting gas (65), the air bag (1), the air bag sensor (8) and the combustion chamber (101), all forming the deployment components of the present invention.

The present invention discloses a mechanism for providing controlled air bag deployment based on the weight of a vehicle occupant. In this regard, the mechanism variably controls the amount of gas in a combustion chamber, which propels the airbag (1). The air bag can deploy with as little or as much force as is appropriate based upon the occupant's weight and the severity of the collision. As shown in FIG. 4, the controlled release of gas (65) from the gas canister (60) is accomplished by the release valve configured with the sliding pot (61), which is open a specific amount as a result of the energy generated by the accelerometer (40). As a result, the force of deployment of air bag (1) correctly matches the force of occupant (110) on seat (10), occupant (110) and seat (10) showing in FIG. 1.

Figure 1:
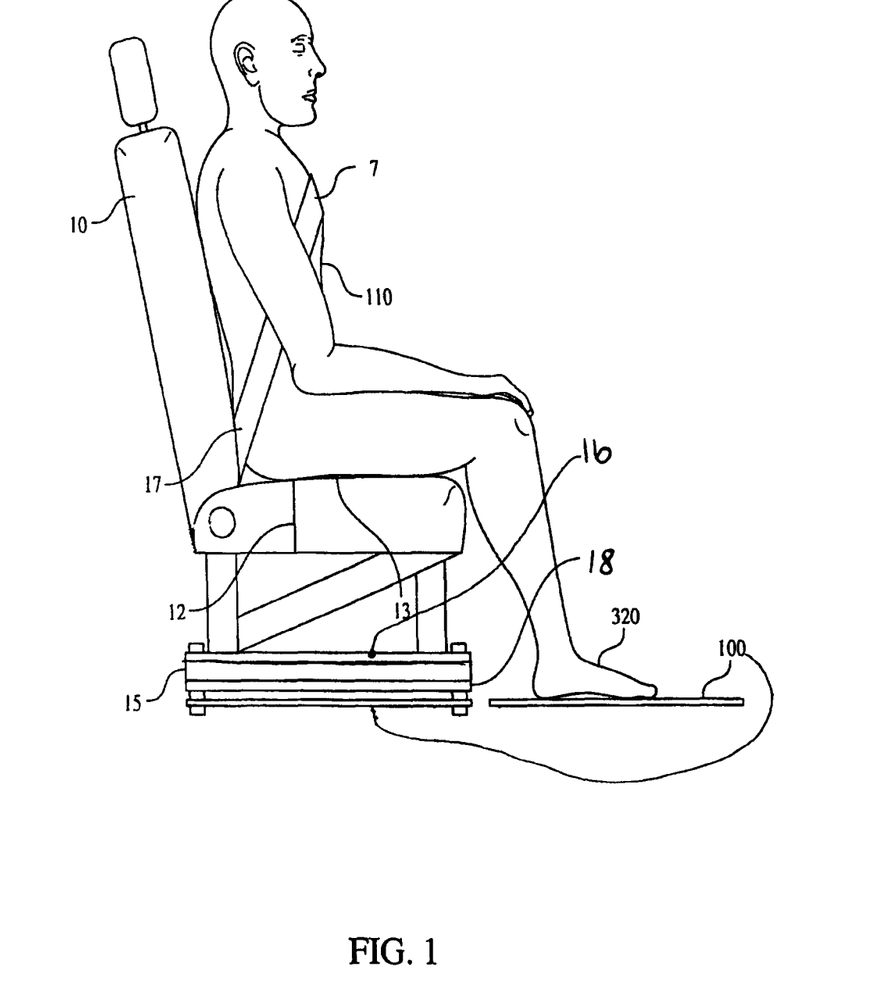
FIG. 1 is seen to represent a side view of a vehicle occupant (110) on a seat (10) having load cells (15) configured with a temperature sensor and mounted between the seat mounting surface and the floor of the vehicle in order to enable detection of the occupant and to control the deployment of the airbag system of the present invention.

With reference to FIG. 1, seat cushioning (12) and floor (100) are shown. Seat (16) is mounted on a load cell (15), which is disposed between a seat mounting frame (16) and the floor (100) of the vehicle. The load cell (15) ascertains the weight of the seat (10) and the occupant (110) therein. A temperature sensor (18) is configured with the load cell (15) for distinguishing between an occupant (110) and any luggage. Temperature sensor (18) is positioned in sight line of the legs or feet of occupant (110) and has a conventional infrared sensor to sense occupants (110) temperature.

Figure 2:
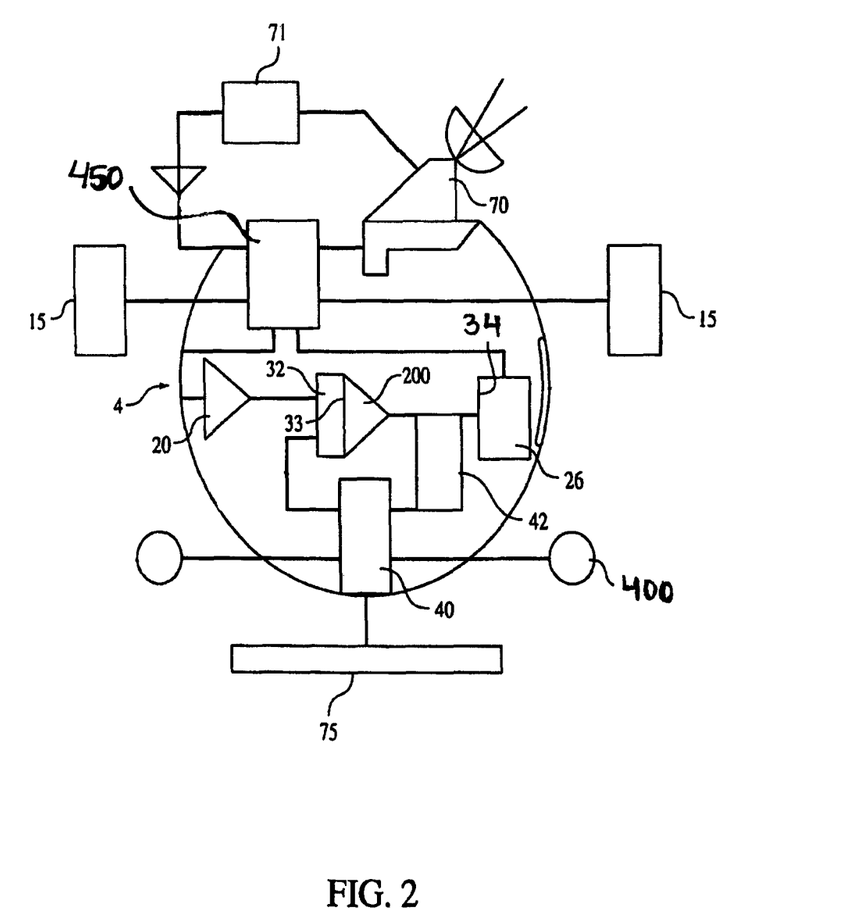
FIG. 2 is seen to represent the transistorized switches (04) and a block diagram of the primary components of the airbag system of the present invention.

Turning to FIGS. 1 and 2, the preferred embodiment of the present invention is shown. The system generally comprises the known standard configuration for a passenger and driver's-side frontal air bag. Both the passenger and driver's-side versions of the present invention are configured similarly. Therefore, only the passenger side air bag system will be described in detail.

Figure 3:
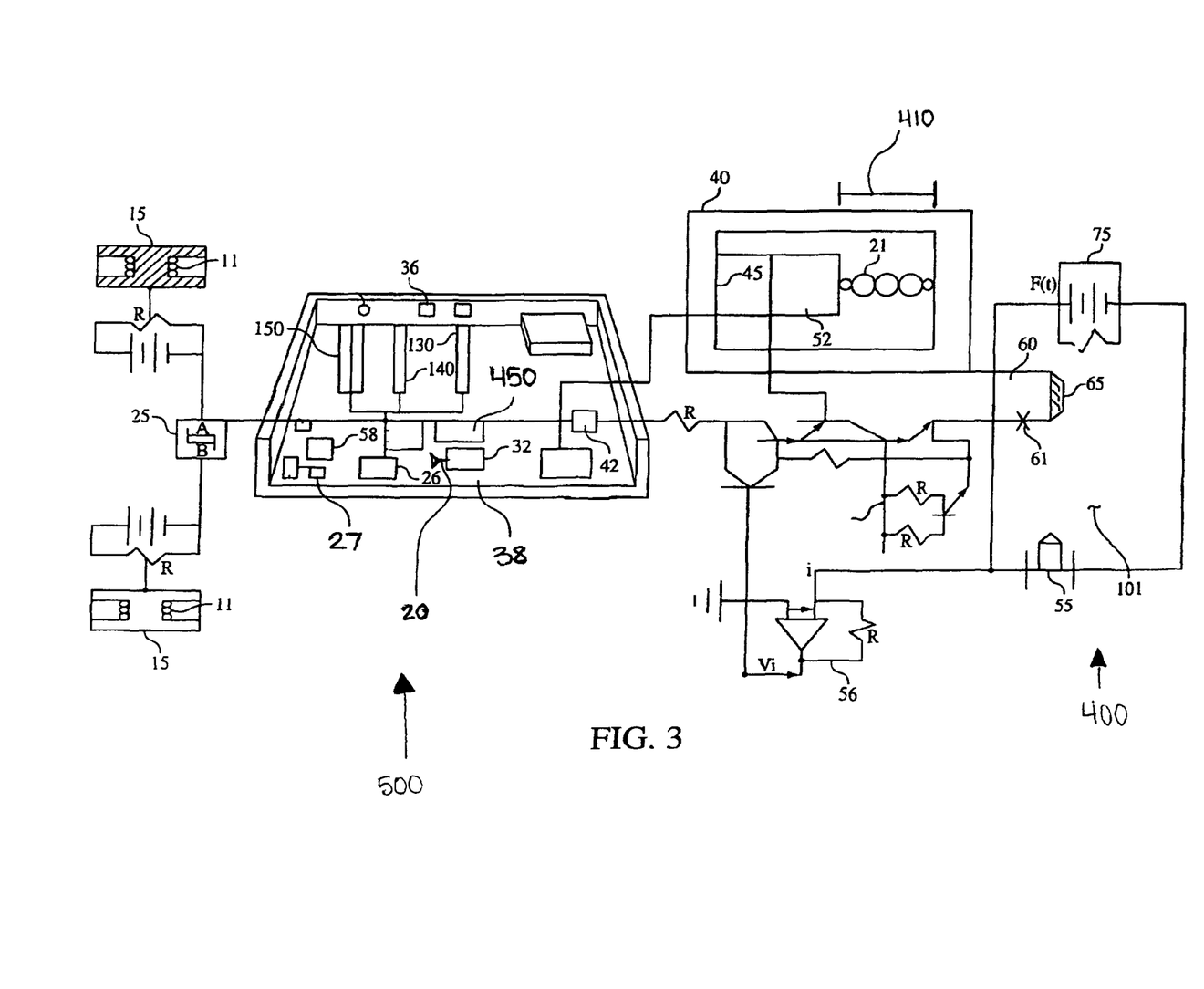
FIG. 3 is seen to represent a sectional view of the load cell (15) showing the strain gages (11) and sensor circuitry representing a detection platform including a circuit diagram for the components of the present invention.

In FIG. 3, the reference number (15) is seen to represent load cells mounted beneath the two front seats. In FIG. 3, the accelerometer (40) is seen constructed with the accelerometer spring (21), and the accelerometer crystals (45), the accelerometer mass (52). The accelerometer is operatively connected to the gas current igniter (55), and the measured acceleration is seen to represent components of the accelerometer (40) configured with the gas canister (60) having a gas release valve relay (42) for releasing gas into the combustion chamber (101). A collision sensor (75) and a gas current igniter (55) are configured with the accelerometer (40) and operatively configured with the gas canister (60) though a processor. In FIG. 4 the sliding port opening (67) of the gas canister (60) for the controlled release of gas (65) into the combustion chamber (101) is shown. Gas is pressurized from the gas canister (60) through the sliding port opening (67) to the combustion chamber (101) for ignition by the gas current igniter (55) therein, initiating a proportionate amount of deployment force of the first layer (3) of airbag (1).

As shown in FIG. 2, the accelerometer (40), upon receiving an amplified signal from the amplifier (20), enables line signals to the gas canister sliding port (61) of FIG. 4 to open the sliding port opening (67). As shown in FIG. 3, the sliding port opening (67) enables the gas release valve relay (42) to automate the controlled release of gas (65). The controlled release of gas (65), when ignited by the gas current igniter (55), deploys the air bag (1) intelligently with a force that is proportionate to the weight of the occupant (110). The energy generated by the accelerometer crystals (45) displaces the accelerometer mass (52) in the accelerometer (40), to generate a corresponding amount of electrical energy therefrom, such as might occur if accelerometer (40) is piezoelectric. This high accuracy weighing system is also designed to carry in vehicle information about occupant (110). By incorporating a ROM and BIOS (58), a RAM (32), and software program in communication with load cell (15), the present invention is capable of recording any and all information about the weight of occupant (110). The ROM and BIOS (58) is configured such that the BIOS provides basic control over the load cell (15).

The ROM of the ROM and BIOS (58), is a special chip that contains instructions and information in its memory that cannot be changed; whereas the RAM (32) is the primary memory storage for the occupant's (110) information. The accelerometer (40) generates electrical energy when put under mechanical stress; this is measured acceleration (410). Applying pressure on the surface of the accelerometer crystals (45) creates the measured acceleration (410). This pressure is initiated by the occupant's (110) applied weight on the seat (10). The measured acceleration (410) is then passed on to the accelerometer (40). The accelerometer converts the stress value corresponding to the weight of the occupant (110) into an acceleration value corresponding to the proper amount of acceleration at which the air bag (1) would have to be deployed to protect the occupant (110) in the event of a collision.

The electrical energy generated by the accelerometer crystals (45) will displace the accelerometer mass (52) in the accelerometer (40), and the displacement force will react on the accelerometer spring (21), enabling the accelerometer spring (21) to contract to an amount in proportion to the occupants weight applied on the seat (10). The force reacting on the accelerometer spring (21) is proportionate to the weight of the occupant (110). When a collision is sensed, the collision sensor (75) will enable the control module (450), configured with the collision sensor (75). Then, the control module (450) will enable the amplifier (20) to amplify the signal from the load cell (15) and the collision sensor (75) to the accelerometer microprocessor (150) and the current gas release control canister microprocessor (130), configured with the gas release valve relay (42). The control module (450) will enable the gas current igniter (55) to ignite the controlled release of gas (65) inside the combustion chamber (101) for the air bag (1). The force created during the combustion inside the combustion chamber (101) is the deployment force of the air bag (1). The speed of the vehicle and the collision threshold for enabling the activation of the airbag (1) determine the crash severity and allow the seat belt (17) to lock the occupant (110) in place while the air bag (1) protects the occupant's (110) upper body from moving. The load cell (15) differentiates adults from kids with the highest degree of reliability. Occupants are differentiated from objects through temperature sensor (18). The occupant's (110) direct weight on the surface of the seat (10), and the occupant's (110) weight on the floor (100) are transmitted to the load cell (15) to equal the occupant's (110) input or weight. The weight information is kept constant so that even if the occupant (110) moves around the seat, the weight information at the address line (33) will not change. But when the occupant (110) finally leaves the seat, the erasable programmable read only memory—EPROM (34) will erase the occupant's (110) weight information from the address line (33). That is, when a new occupant (110) is seated, new information will be sent to the address line (33). Accordingly, the parameter of weight for the air bag (1) to enable deployment is precisely determined.

Figure 5:
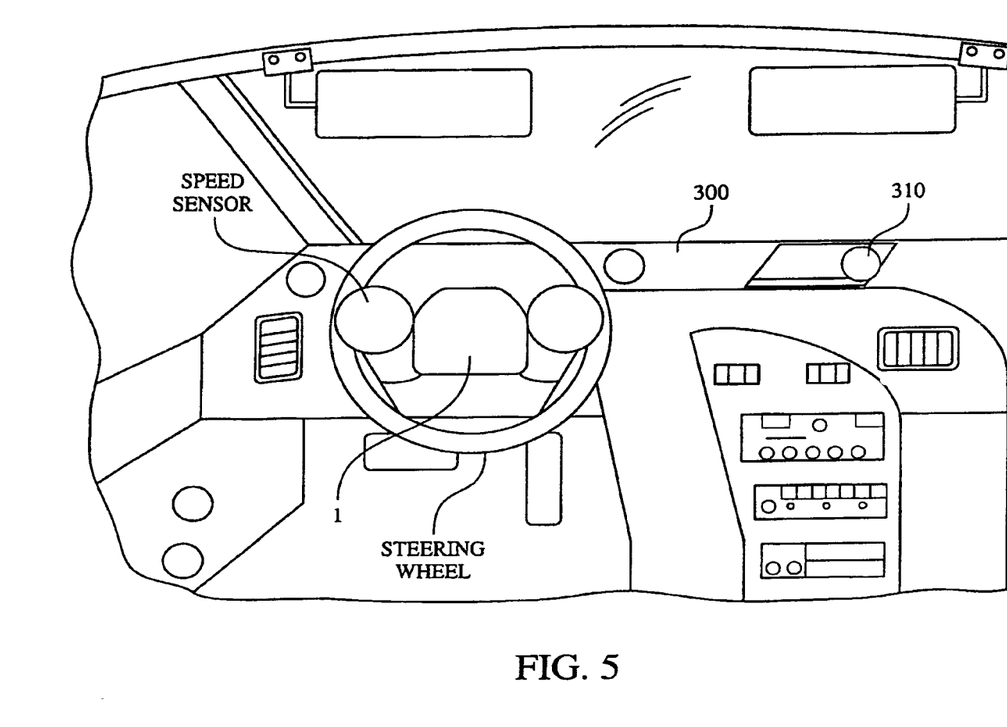
FIG. 5 is seen to represent the interior of the vehicle showing the airbags (1), the dashboard (300), and the pressure sensor (310) mounted on the dashboard for enabling signal communication when active.

With the smart seat belt control system (U.S. Pat. No. 6,728,616 and U.S. application Ser. No. 09/959,503) and the present invention enabled from a single control module (450), the actual weight of the occupant (110) is measured when the occupant (110) is seated and/or belted in. Thus, by ensuring that the correct occupant's (110) weight is sent to the control module (450) to enable calculation of the occupant's (110) mass, the proper deployment force of airbag (1) is determined. Even if the occupant's legs (320) are on the dashboard (300), the weight information will not change, but the occupant's (110) legs (320) will trigger a pressure sensor (310) that will warn the occupant (110) of an unsafe behavior. The warning signal, for example, may be a human voice warning signal, and may only go off when the behavior is corrected.

The present invention could be programmed not to deploy when a child's weight is sensed on the seat (10). That is, the child's weight could be defined as a weight limit of less than 20 lbs, provided the child is properly belted. The present invention will reduce air bag (1) induced injuries when deployed because the deployment force is proportionate to the occupant's weight on the seat (10). By using the load cell (15) to sense the occupant's weight on the seat (10) before controlling the deployment of the airbag (1), deficiencies on the current sensing means for the current airbags are eliminated. The load cell (15) intelligently measures the part of the occupant's weight that is on the floor (100) and the other part of the weight on the seat (10), thereby guaranteeing an accurate measurement of the occupant's weight. In addition, once the occupant (110) is seated, the exact weight reading of the occupant (110) will be measured and sent to the address line (33), so that when the occupant (110) constantly moves around the seat (10), the weight value at the address line (33) will not change.

The EPROM (34) will only change the weight value when the occupant (110) is totally replaced, and that is what makes present invention smarter. If the occupant (110) is properly belted in, during high-speed crashes, the occupant (110) will fully benefit from the present invention because the airbag (1) will hold the occupant (110) in place, while preventing the occupant's (110) upper body from moving. The present invention, together with the smart seat belt control system, U.S. Pat. No. 6,728,616 and U.S. application Ser. No. 09/959, 503 further increases the accurate weight reading with the load cell (15) and improves the occupant's (110) protection.

The preferred embodiment of the present invention includes the known standard configuration of the occupant (110) airbag (1). Airbag (1) could be positioned as to be any front, side, ceiling, rear or any other airbag. Thus, the present invention provides for airbag (1) to be accurately deployed based on the weight and mass of the occupant (110). Specifically, more than one load cell (15) maybe used with the present invention to accurately compute the occupant's (110) weight for the accurate deployment of the airbag (1).

In place of the load cell (15). any conventional pressurized bag, inflatable bag or inflated bag that could be mounted on the surface of the seat (10) or beneath the seat (10). When an occupant (110) takes the seat (10), the weight of the occupant (110) will displace X amount of the stored pressure into gas release valve relay (42). The said weight of the occupant (110) will initiate any conventional inflatable air bag to inflate X amount of air to the gas release valve relay (42) that will record the displacement X, or inflation X, as the occupant's (110) weight value. The displaced pressure or inflated air pressure is the maximum pressure at which, when the collision sensor (75) senses a collision, the accelerometer (40) will be activated. The accelerometer (40) in turn controls the deployment speed and force of the airbag (1), which will equal the said maximum displaced pressure X, where the stored pressure is the maximum pressure for the maximum acceleration and deployment force of the airbag (1) that may be initiated when the collision sensor (75) senses a collision of sufficient magnitude.

The weight of the occupant (110) will displace the stored pressure to an amount X that is equal to the weight value of the said occupant (110). If the weight value exceeds the stored pressure, then the acceleration and the deployment force will have a constant value when a collision is sensed. The recorded displacement X will be transformed into a weight unit for the CPU (26) to recognize. The CPU (26) will then carry on the calculations and computations the same way as if the weight unit had been received from the load cell (15). Every process is the same from the displacement point X, when comparing the conventional pressurized bag operation with the load cell (15) operation. Accordingly, for a more accurate description, only the load cell (15) will be elaborated upon in the below description.

The air bag system generally comprises the known standard configuration for an airbag (1). When a conventional ignition switch is turned on, an electrical current of 5 millivolts energizes the load cell (15) before the computer (500) is enabled. When the occupant (110) sits on seat (10), the load cell (15) will use the input energy from the occupant's (110) body to start a string of events that will be sent to the RAM (32) to enable data processing and computation. The post (36) inside the computer (500) will then check all the hardware components for functionality to ensure that the hardware components and the CPU (26) are functioning properly. The post (36) will later send signals over specific paths on the motherboard (38) to the load cell (15) to account for the weight signals or responses to determine the occupant's (110) actual weight value. The input energy from the occupant's (110) body when seated is received as force energy. The load cell (15) will then output the force energy as weight and send this to the control module (450) that will then identify the seat (10) that has the occupant (110), before activating the motherboard (38). This motherboard (38) is where all activities are sent for processing. The result of the post (36) reading will be analyzed in the CMOS (27). At the completion of the post (36) readings, the boot program will then check to ensure that there is an occupant (110) on seat (10). This program will then send the occupant's (110) weight to the address line (33).

The airbag system generally comprises the known standard configuration for an occupant (110) air bag (1). The seat (10) is mounted on the load cell (15) that is bolted between the seat mounting frame (36) of the seat (10) and the floor (100) of a conventional vehicle in order to provide a solid support. Mounting the seat (10) on the load cell (15) and on the seat mounting frame (16) will enable a precise and accurate reading of the occupant's (110) weight on the load cell (15). The load cell (15) ascertains the weight of the seat (10) and any occupants' (110) therein. The load cell (15) can also be calibrated so that the weight of the seat (10) will be the zero point reading. Mounting the load cell (15) between the seat mounting frame (16) of the seat (10) and the floor (100) of a conventional vehicle or on a rigid sliding or fixed surface, rather than within the seat (10), the load cell (15) is more likely to obtain an accurate computation of the occupants (110) weight.

Each load cell (15) has one or more strain gages (11) that are configured to sense a force applied to them when an occupant (110) sits on the seat (10). The strain caused by the weight of the occupant (110) on the seat (10) is measured by the strain gauge (11), which delivers an electrical line signal to the control module (450). The computation of occupant's (110) weight is not subject to faulty readings as it would be if any sensors were mounted in the seat cushion. If mounted in the seat cushion, any uneven loading of the seat (10) could cause an inaccurate estimate of the occupant's (110) weight.

The high accuracy weighing system is designed to carry information about the occupant (110) by incorporating a ROM and BIOS (58), a RAM (32), and a software program inside the load cell (15), to record information about the occupant's (110) weight and to note any changes in this value. The BIOS of the ROM and BIOS (58) provides basic control over the load cell (15) and is stored in the ROM of the ROM and BIOS (58). The ROM of the ROM and BIOS(5), which is a special chip for the computer (500), contains instructions and information in its memory that cannot be changed, whereas the RAM (32) is primary storage for the occupant's information. Accordingly, it will display and record in the RAM (32) all the necessary computed weights and also communicate to the CPU (26) this information in order to allow calculation of the mass and other necessary information needed to enable the control of the variable deployment force air bag (1).

The deployment of such air bag (1) generates a deployment force, where such generated force, with the use of the present invention, or by incorporating the software program inside the load cell (15), is proportionate to the computed weight of the occupant (110) on the seat (10). The software program enables communication with the driver and the occupant (110), if necessary, in order to properly protect the occupants (110) from an unintended behavior when the vehicle is in motion. The air bag (1) in the vehicle is supported and controlled by this deployment force control system.

This applied weight will enable the strain gauges (11) to then be strained, compressed, pressured, or stretched in a corresponding amount, causing a change in voltage signal on the connecting lines or wire harness. As the strain gauges (11) are stressed, strained, compressed, or pressured, the effective resistance of the strain gauges (11) will vary in an amount corresponding to the strain. The strain varies in an amount corresponding to the actual weight of the occupant (110). The control module (450), which is a silicon control rectifier, will intelligently identify the seat (10) where the weight signal is outputting from, and manage the flow of the weight data to the ROM of the ROM and BIOS (58). The control module (450) delivers data from the load cell (15) to the CPU (26) which comprises ROM of the ROM and BIOS (58) that has a basic input and output system BIOS. The CPU (26) is also configured with the RAM (32) used to run at least one software program in the CPU (26) configured for calculating occupant's (110) mass value. The RAM (32) runs the software program to access the address line (33).

The ROM of the ROM and BIOS (58) receives data about the occupant (110) from the control module (450) and communicates with the basic input and output system that is operatively connected to the ROM (59) and programmably configured with the address line (33). The RAM (32) takes load cell (15) data about the occupant (110) from the address line (33) and turns it over to the CPU (26) for manipulation.

The CPU (26) uses the address line (33) to find and invoke the ROM (59) to insure an accurate calculation of the occupant's (110) mass and any other information needed to communicate to the accelerometer (40), including tension of the seat belt (17) when the impact force is determined. The CPU (26), upon calculating the occupant mass value, communicates the information to the accelerometer microprocessor (150) that uses the information from the CPU (26) to process and energize the accelerometer crystal (45). The accelerometer crystals (45) then use the processed information from the CPU (26) and the standard 5 millivolts from the starting means to generate a control energy for determining a deployment force and acceleration of the air bag (1) that is proportional to the load cell (15) output weight value of the occupant (110).

The accelerometer crystal (45), upon receiving the 5 millivolts energy from the starting means and the occupant weight information from the CPU (26), generates an electrical energy on its surface that is proportional to the occupant's weight. This energy that is generated by the accelerometer crystals (45) is used to energize the accelerometer mass (52). The accelerometer mass (52) movement, which is dependent on the energy generated by the accelerometer crystals (45) and acting on a spring, will move a distance D as the spring contracts. The energy that is generated by the accelerometer crystals (45) is equal to the force needed to move the accelerometer mass (52) body to the distance D. The same energy from the accelerometer crystals (45) is used to energize the canister microprocessor (130) responsible for enabling the sliding pot (61) and the gas release valve relay (42) to adjust a sliding port opening (67) that will initiate a proportionate amount of igniting gas and igniting current to enable a proportionate deployment force for the air bag (1). The sliding pot (61) and gas release valve relay (42) are enabled by the generated control energy and a proportionate amount of gas is equally released based on this energy amount.

The gas current igniter (55) is operatively connected to the accelerometer and communicatively configured with the air bag (1) to ignite the controlled (released) release of gas (65) into the combustion chamber (101) of the air bag (1) to assure the appropriate and safe deployment force. Where the amount of current generated to ignite the controlled gas (65) is proportional to the voltage generated by the accelerometer crystal (45). The voltage generated by the accelerometer crystal (45) is then transformed, enabling a voltage to current transformation (56) to initiate the proportional amount of current to ignite the controlled gas (65) as the gas is being released into the combustion chamber (101) of the air bag (1). The amount of voltage that is being transformed is the generated energy from the accelerometer crystal (45), which is proportional to the weight of the occupant (110), enabling the air bag (1) to deploy based on the combustion force. As the gas (65) is ignited, combustion is created inside the air bag (1).

The space where the combustion takes place is the combustion chamber (101) and the combustion energy deploys the air bag (1) at a speed and force that is proportional to the occupant's weight, without causing any further injury to the occupant (110). The distance D that the accelerometer mass (52) travels is equal to the distance the accelerometer spring (21) contracts. The weight of the occupant (110), the energy generated by the accelerometer crystal (45), the force acting on the accelerometer mass (52), and the contracting force of the accelerometer spring (21) are all proportional. The distance D that the mass travels is proportional to the distance that the accelerometer spring (21) contracts.

Because components of the instant invention exhibit electromechanical responses that enable equal values, the contraction of the accelerometer spring (21) from the energy generated by the accelerometer crystal (45) is proportional to the deployment force and acceleration for the air bag (1). The amplifier (20) is responsive for amplifying the entire device to enable a speedy output to the accelerometer when a collision is sensed of the pre-set magnitude. All the operations of the processors are done by signals, turning on and off different combinations of transistorized switches (04). These processors are configured to operate the arithmetic logic unit that handles all the data manipulations and are operatively connected to the RAM (32) through the computer motherboard (38). The motherboard (38) interface unit receives data and coded instructions from the computer RAM (32).

The data travels 10 bits at a time, enabling the branch prediction unit to then inspect the instructions to decide on the logic unit. The decoder then translates the response from the load cell (15) into instructions that the arithmetic logic unit can handle. The ALU processes all its data from the electronic scratch pad or register that is secured on the motherboard (38). All results are made final at the RAM (32).

The load cell (15) serves an initial and secondary purpose. Initially, a base line is developed in conjunction with the load cell (15) configuration, representing the weight of only the occupant's seat (10). Once the initial base line is ascertained, during the operation of the vehicle, if the base line amount is not exceeded by a certain amount, the air bag (1) is disabled, thereby preventing the air bag (1) from being used when an occupant (110) is not present. At this point, the boot program will send a 0 message to the RAM (32) and the RAM (32) will recognize that there is an empty seat (10).

The load cell's (15) secondary function is to accurately weigh the occupant (110) when the baseline representing the weight of the passenger's seat (10) is exceeded. This information is then communicated to the control module (450), which will then determine the air bag (1) that should deploy in case the vehicle is involved in an accident. This determination is based on the line signals from the load cells (15) to the control module (450) that is responsible for activating other devices to initiate the proper force at which the air bag (1)

should deploy based on the occupant's weight. A control module (450) is defined as a device that transmits load cell (15) output signal through its internal encoder to other devices. The encoder, which is an analog to digital transmitter, transforms load cell (15) output signals from analog to digital and communicates to the address line (33) as the occupant's weight. The RAM (32) then receives the digital weight signal from the address line (33) and sends it to the CPU (26) for computations.

The CPU (26) then calculates the occupant's mass and also computes all the necessary information required to enable a safe deployment of the air bag (1) without causing any further injuries to the occupant (110). All the information is transmitted through line signals, turning on and off different combinations of the transistorized switches (04). The control module (450) will signal the amplifier (20) to amplify the accelerometer microprocessor (150) when a collision is sensed by the collision sensor (75). At this point, the accelerometer (40) will compute the air bag (1) deployment acceleration from the weight and mass information of the occupant (110) at the address line (33). The accurate deployment force at which the air bag (1) should deploy is then enabled based on the occupant's weight. The accelerometer microprocessor (150) is amplified when the collision sensor (75) senses a collision of the predetermined magnitude. The safe acceleration required at the deployment point is directly proportionate to the force generated by the weight of the occupant (110). This acceleration is based on the measurement of the force acting on the accelerometer mass (52) of the accelerometer (40). The collision force exacted on the occupant (110) of the vehicle is measured and the air bag deployment force is determined by generating a force necessary to prevent the occupant (110) from moving relative to the acceleration.

The accelerometer spring (21) and the accelerometer mass (52) inside the accelerometer (40) enable a resonance. Where the resonance is defined as the peak in the frequency response. The frequencies in the movement of the accelerometer mass (52) must be less than the resonant frequency. The accelerometer sensor is dynamic. Accordingly, the load cell (15) will receive the occupant's weight and enable communication with the control module (450) that will then communicate the occupant weight information to the encoder that transformed the weight from analog to digital. The control module (450) is connected to the ROM (59). The ROM (59) then checks the software instructions about the occupant (110) for confirmation before communicating the weight information to the address line (33). The information is then kept secured and protected from vibrations and bumps so that only the RAM (32) can activate the data.

The RAM (32) receives the occupant (110) information from the address line (33) and enables communication with the CPU (26) that is responsible for enabling all the necessary computations of the occupant's mass. This information is then sent to the accelerometer crystal (45) that uses the information to generate electrical energy that is proportional to the weight of the occupant (110) on the seat (10). The energy generated by the accelerometer crystal (45) enables the accelerometer mass (52) and the accelerometer spring (21) to operative and set the deployment force and speed of the airbag (1).

When a collision is sensed by the collision sensor (75), if the magnitude of the collision exceeds a preset limit where injuries are certain, the collision sensor (75) will enable communication signal to the accelerometer microprocessor (150) that will then signal the control module (450) to check if there is an occupant (110) in the seat. The control module (450), will then enable a communication signal to the amplifier (20) that will then empower the gas release valve relay (42) and the canister microprocessor (130) to initiate the volume of gas (65), that when ignited, will generate a deployment force that is proportional to the weight of the occupant (110) on the seat (10). That is, the collision sensor (75) senses a collision of a prescribed magnitude and transmits this signal to the control module (450).

The control module (450) then identities which load cell/ seat sent the weight information and coordinates the deployment of the air bag (1) that is linked to the occupied seat (10). The control module (450) outputs the communication signals through the specialized array to the CPU (26) before reaching the accelerometer (40). The value of the occupant's weight will initiate an equal amount of force that is communicated as input into the accelerometer crystal (45). This input force acting on the accelerometer crystal (45) enables the accelerometer crystal (45) to generate electrical energy that is proportional to the force. The electrical energy created by the accelerometer crystal (45) is sent to the accelerometer mass (52), which is connected to the accelerometer spring (21). The force acting on the spring is proportional to the weight of the occupant (110). The accelerometer spring (21) is configured with the accelerometer mass (52), and responsible for the air bag acceleration by contracting to a distance Z, where Z is the measured acceleration.

A transient voltage suppressor (200) is located between the control module (450), and the address line (33). Recognizing that electronic equipment characteristically suffers from transient voltage spikes and that such spikes would cause abnormal readings or reactions for the RAM (32), a transient voltage suppressor (200) is used in order to filter out transient spike phenomenon. Thus, an accurate value for weight is ensured.

An electrical signal from the load cell (15) is further amplified by the transistorized switches (04) configured with the control module (450), communicatively configured to assist in managing the flow of data from the load cell (15), enabling input and output signals to the CPU (26) for computation. The control module (450) discriminates between the occupant (110) side and the driver side load cell (15) to determine which air bag (1) is to be enabled. The signal is next processed by the control module encoder, which converts this signal from analog to digital before enabling further transmissions in binaries. The accelerometer (40) is communicatively configured with the amplifier (20) and sends line signals to the gas canister sliding pot (61) and the gas relay valve relay (42) to open an area that is proportional to the occupant's weight signal and to release the volume of igniting gas (65) that, when ignited, generates a deployment force that is equally proportional to the weight signal of the occupant (110).

The volume of igniting gas (65), when ignited by the gas current igniter (55), enables combustion inside the air bag (1) that generates a deployment force that is proportional to the weight of the occupant (110) and holds the occupant (110) on the seat without causing any injury to the occupant (110).

Because the readings from the load cell (15) are dynamic, a new acceleration value is computed each time a new weight signal is output from the load cell (15). The weight value from the address line (33) is operatively communicated to the accelerometer (40) to apply a proportional amount of force against the accelerometer crystal (45). The energy generated by the accelerometer crystals (45) displaces the accelerometer mass (52) configured with the accelerometer spring (21) to generate a corresponding amount of electrical energy there from, such as might occur with an accelerometer (40). The accelerometer crystal (45) for the accelerometer (40), when put under stress, generates electrical energy. This stress is created when 5 millivolts is enabled to activate the load cell (15) which then enables a signal to the control module (450) configured with the CPU (26). The CPU (26) outputs are acted upon the surface of the accelerometer crystal (45), to enable pressure there across. Many types of accelerometers may be used. Currently, the preferred accelerometer is described.

The electrical energy generated by the accelerometer crystals (45) is recorded in millivolts. The voltage developed by the accelerometer crystals (45) is correlated to the necessary force required for protecting the occupant (110). This voltage is functionally transformed into current transformation (56) that variably generates the gas current igniter (55) and the amount of energy to initiate movement of the sliding pot (61) and the gas release valve relay (42). That is, the voltage enables communication signals in order to generate a current that enables the gas current igniter (55) to ignite gas (65) from the gas canister (60) into the combustion chamber (101). The combustion chamber (101) is the inside space of the air bag (1), where the weight controlled igniting gas (65) and the weight generated gas current igniter (55) ignite when a collision of a prescribed magnitude is sensed by the collision sensor (75). The igniting gas initiates the deployment force of the air bag (1). The current flow and the volume of igniting gas (65) employed are controlled to provide the desired expansion rate of the air bag (1).

Thus, there is an allowance for a changeable variation between the upper and lower threshold for enabling the deployment force of the air bag (1). Therefore, regardless of the changing weight of the occupant (110), the proper amount of the igniting gas (65) is ignited by the gas current igniter (55) to propel the air bag (1) with just enough force to cushion the occupant (110), without causing further injury The control module (450) interprets the output from the load cell (15) as the occupant's weight and converts it into a weight value. This weight value corresponds to the weight of the occupant (110) and is then sent to the address line (33). The RAM (32) picks this weight signal from the address line (33) and sends it to the CPU (26) in order to calculate the passenger's mass and all necessary calculations. The weight value and the mass value are then passed onto the accelerometer microprocessor (150) configured with the accelerometer (40). The accelerometer (40) converts the weight value corresponding to the occupant's weight into a force value corresponding to the proper amount of igniting gas that when ignited enables the acceleration at which the air bag (1) would have to be deployed to protect the occupant (110) when a collision of the prescribed magnitude is sensed.

The CPU (26) also controls the gas discharge canister microprocessor (130) that is connected to the gas release valve relay (42). Thus, the discharge lid or sliding pot (61) of the gas canister (60) uses the controlled energy from the accelerometer crystal (45), configured with the CPU (26), to provide the desired expansion rate of the air bag (1). The discharge lid or sliding pot (61) is defined as the outlet or a means to release a controlled volume of gas from its contained space. There is an allowance for infinite variation between an upper and lower threshold for the deployment force of the air bag (1). Therefore, regardless of the weight of the occupant (110), the proper amount of gas is ignited in order to propel the air bag (1) with just enough force to cushion the occupant (110) without any further injury.

The controlled release of gas (65) from the gas canister (60) is enabled by a sliding pot (61), which is opened to discharge gas (65) through the sliding port opening (67) in a specific amount as initiated by the voltage generated by the accelerometer crystals (45). As a result, the force of the deploying air bag (1) should correctly match the force needed to slow the occupant (110).

In other to employ the present invention in the event of a rear end collision, the present invention uses a radar unit (70) to sense the imminence of a rear impact. This data is communicated to the control module (450), which controls the detection of occupants on the seats in order to enable the deployment of the air bag (1) with the proper force as discussed above. In a frontal impact of about 13.2 MPH the collision sensor (75) is activated. The speed of 13.2 MPH represents the threshold speed at which the efficacy of any air bag system should usually become activated. At collisions of below 13.2 MPH, the air bag system tends to become less effective and the expense of deployment makes it a less then optimal solution. Thus, the present invention can function even if the front impact is of an extremely low speed. The preferred embodiment of the present invention would not engage until an occupant (110) is detected and the front impact of 13.2 MPH and above is achieved. At that time, the data stored in the RAM (32) is used as the proper force calibration and the air bag (1) would deploy with the proper volume of propellant.

The weight of the occupant (110) is correlated into an expected impact force and the desired amount of propellant or gas (65) is ignited in the combustion chamber (101) of the air bag (1) by the gas current igniter (55) to provide the cushioning which balances this force, but does not over power the occupant (110) and force the occupant (110) backwards into the passenger's seat (10) at such a rate as to cause injury.

To employ the present invention in the case of a rear end collision, an enhanced embodiment of the present invention includes a radar unit (70), which senses the imminence of a rear impact. This rear impact data is received by the radar receiver (71), which is connected to the radar unit (70) and communicatively connected to the control module (450), which discriminates between the occupied seat (10) and the unoccupied seat (10). The amplifier (20) is operatively configured with the radar unit (70) and configured to receive signals from the control module (450) in control the deployment process of the air bag (1) with the proper force as described above.

The radar unit (70) and the radar receiver (71) are seen to illustrate the primary embodiment for communicating rear-end collision information in the present invention. In the illustration, the air bag (1) has two layers (3, 4) to further minimize the impact of deployment. An internal layer (3) is the base of the air bag (1) itself, which is configured to be deployed according to the system described above. An external layer (4) is the cushion layer characterized by being foamy. There is a gap (6) between the two layers (3, 4) that provides a cushion-like contact with the occupant (110). As described before, the weight of the occupant (110) is correlated into an expected impact force and the desired amount of propellant or gas (65) for the air bag (1) is ignited to provide the cushioning which balances this force, but does not over power the occupant (110) and force the occupant backward into the passenger's seat (10) at such rate as to cause injury. The greater the volume of propellant or gas (65) for the air bag (1), the smaller the gap between the two air bag layers (3,4) upon deployment associated with such controlled energy. Thus, the two-layer air bag (1) serves to maximize protection for the occupant (110) and to further prevent air bag deployment injuries.

Another embodiment of the present invention includes several conventional sensors (7,8) at least one positioned on the seat belt (17) configured for restraining the occupant (110) on the seat, and at least one positioned on the air bag (1). The air bag sensors (8), which comprise of magnetized elements, are configured to communicate to each other so that the deployment direction of the air bag (1) is correlated to enable controlling the air bag (1) away from the head of the occupant (110), so as to further prevent injury.

The time constant is so important in configuration of the computer device because the timing of the collision and enabling the deployment of the air bag (1) determines the performance of the advance weight responsive supplemental restraint computer system. The device can use different time constant circuits.

The RL time constant is an inductor and resistor used for the design of the time circuit for the control system, the computer system, and the detection platforms. When a current is transmitted to the inductor, a magnetic field is created around the inductor. If the current is interrupted, the magnetic field collapses very quickly. The magnetic field is allowed to collapse at a controllable rate by an intermediate condition responding between maintaining the magnetic field and allowing it to collapse rapidly. The resistor is configured to determine the rate at which the magnetic field collapses. This time constant is further a measure of the time required to discharge the controlled gas (65) into the combustion chamber (101) for the ignition that then enables the air bag deployment. The time constant is a specific amount of time required to attain 100 percent of discharge of gas inside the combustion chamber (101).

The accelerometer (40) as described in this invention generates electricity when put under mechanical stress. This stress is caused by applying pressure or force against the surface of the accelerometer crystals (45) or by twisting. The effect takes place in crystalline substances like quartz, Rochelle salts tourmalines, diamonds, and sapphires, to name just a few. The pressure in the accelerometer (40) causes an electric potential which is communicated through wire harness to enable the opening of the discharge pot or control valve of the gas canister. The occupant (110) exacting a force by sitting on the front seat initiates the pressure. The electromotive force created by the piezoelectric accelerometer (40) is extremely small, and is measured in millivolts or microvolts. The small amount of EMF created keeps this computer device safe at all times. The present device utilizes built in logic in the CPU (26) to precisely control all the communication system that provides means for activating the air bag (1).

The processors for the present invention are communicatively configured to provide sensed information to the CPU (26) and other devices to enable responses about the occupant on the seat for processing. The CPU (26) is responsible for providing communication signals that enable variable force-speed deployment and instantaneously regulating all of the given information. The control module (450) is configured to help the CPU (26) perform all calculations. The amount of discharge gas (65) is properly controlled to protect vehicle occupants of all sizes. The discharge of gas (65) and the gas combustion occurs in a variable mode that is capable of responding to a change in occupants (110) of the vehicle.

The control module (450) delivers data from the load cells (15) to the CPU (26), which comprises ROM (59) that has a BIOS. The CPU (26) also comprises the RAM (32) used to run at least one software program in the CPU (26) configured to calculate occupant weight values. The BIOS stores the load cell data as a weight measurement in the address line in the BIOS. The RAM (32) runs the software program to access the address line in order to obtain the weight measurement and communicates this measurement to the software program in the CPU (26). The software program in the CPU (26) calculates and confirms the weight measurement and determines the operating weight value for the occupant in each seat.

The operating weight value is then communicated to the air bag system corresponding to the seat (10). In one embodiment, the air bag system comprises one or more air bags (1) connected to a deployment system. In another embodiment, the deployment system comprises a combustion chamber (101) that is connected to a gas canister (60) of igniting gas (65). In the present invention, the air bag system further comprises an accelerometer microprocessor (150) electrically connected to an accelerometer (40) that is electrically connected to a canister microprocessor (130) and operatively connected to a sliding pot (61). The canister microprocessor (130) is electrically connected to a gas release valve relay (42) and a gas current igniter (55). The sliding pot (61) is connected to the combustion chamber (101). The gas release valve relay (42) is connected to a release valve between the gas canister (60) and the combustion chamber (101).

The operating weight value is received within the air bag system by the accelerometer microprocessor (150). The accelerometer microprocessor (150) delivers a signal to the accelerometer (40) corresponding to the operating weight value. This weight value is translated to a corresponding proportional electrical current that energizes the accelerometer crystal (45) in the accelerometer (40). In this way, the accelerometer (40) is used in reverse to its normal function. The energy from the accelerometer crystal (45) is also proportional to the operating weight value, which represents the weight of the occupant (110) in the seat (10). The electrical energy from the accelerometer crystal (45) is converted to mechanical energy and employed to displace the accelerometer mass (52) in the accelerometer (40). The distance D is directly relating to the crystal energy. The accelerometer mass (52) abuts an accelerometer spring (21), which is correspondingly compressed by the displacement of the mass to an amount, which is directly related to the distance D. The accelerometer spring (21) compression is thus directly related to the crystal energy, which is directly related to the operating weight value of the occupant (110) on the seat (10).

The compression of the accelerometer spring (21) is the culmination of translating the electrical energy of the current applied to the accelerometer crystal (45) into the mechanical energy applied to the sliding pot (61). This mechanical energy is used to adjust the opening in the combustion chamber (101) for the gas to expand into the air bag (1) when ignited. In conjunction with this adjustment, the canister microprocessor (130) receives the same signal from the accelerometer microprocessor (150) that is delivered to the accelerometer (40) that corresponds to the operating weight value. The canister microprocessor (130) utilizes this signal to communicate to the gas release valve relay (42) a specific volume of the gas (65) to be released through the release valve into the combustion chamber (101).

In deciding the required speed at which the computer logic should respond to the occupant's weight value during collision, the decimal readings are transformed into binaries. The transistorized switches (04) will then recognize the binaries as OFF and ON switches configured to represent "1s" and "0s". Where the 0s represent OFF signals and the 1s represent ON signals. The OFF is an open circuit and the ON is a closed circuit. Below are the weight values in decimals and binary representation of the OFF and ON electronic switching. The binaries are logically used to inform the computer system of the number of switches that need to be turned ON and OFF to influence accurate responses to the weight signals during collision. Accordingly, the computer system will energize the active devices that will activate the control energy for enabling the smart deployment of the air bag (1) without causing further injury to the occupant (110). This advanced and smart technology will appreciate weight sizes of any degree and fully protect the occupant (110) with a controlled energy generated from the weight value of the occupant (110).

The table below contains example weights and an indication of the time the computer (500) will take to respond to the weights of the occupants of a vehicle by turning the switches ON and OFF on time. The computer (500) for the present invention comprises a control means that uses logical functions to timely open and close all circuits with these switches. This logic depends on the switches to open and close on time for this smart and intelligent device to know who the occupant is by the weight value, before activating the deployment system of the air bag, which is configured to deploy with a force corresponding to a controlled energy value that is directly related to the weight of the occupant. The weights are promptly transmitted to all the intelligent devices used in this invention to influence the control of energy that will enforce deployments that are totally dependant on the occupant's weight value. The switches are activated when the collision sensor senses collision. This arrangement of the entire circuit signals the RAM and the computer CPU to initiate the controlled deployment of the air bag (1).

A1:A501

| WEIGHT IN DECIMALS | WEIGHT IN BINARIES "off & on switches" | SPEED "minimum speed for deployment" |
|---|---|---|
| 1 | 1 | 13 MPH |
| 2 | 10 | 13 MPH |
| 3 | 11 | 13 MPH |
| 4 | 100 | 13 MPH |
| 5 | 101 | 13 MPH |
| 6 | 110 | 13 MPH |
| 7 | 111 | 13 MPH |
| 8 | 1000 | 13 MPH |
| 9 | 1001 | 13 MPH |
| 10 | 1010 | 13 MPH |
| 11 | 1011 | 13 MPH |
| 12 | 1100 | 13 MPH |
| 13 | 1101 | 13 MPH |
| 14 | 1110 | 13 MPH |
| 15 | 1111 | 13 MPH |
| 16 | 10000 | 13 MPH |
| 17 | 10001 | 13 MPH |
| 18 | 10010 | 13 MPH |
| 19 | 10011 | 13 MPH |
| 20 | 10100 | 13 MPH |
| 21 | 10101 | 13 MPH |
| 22 | 10110 | 13 MPH |
| 23 | 10111 | 13 MPH |
| 24 | 11000 | 13 MPH |
| 25 | 11001 | 13 MPH |
| 26 | 11010 | 13 MPH |
| 27 | 11011 | 13 MPH |
| 28 | 11100 | 13 MPH |
| 29 | 11101 | 13 MPH |
| 30 | 11110 | 13 MPH |
| 31 | 11111 | 13 MPH |
| 32 | 100000 | 13 MPH |
| 33 | 100001 | 13 MPH |
| 34 | 100010 | 13 MPH |
| 35 | 100011 | 13 MPH |
| 36 | 100100 | 13 MPH |
| 37 | 100101 | 13 MPH |
| 38 | 100110 | 13 MPH |
| 39 | 100111 | 13 MPH |
| 40 | 101000 | 13 MPH |
| 41 | 101001 | 13 MPH |
| 42 | 101010 | 13 MPH |
| 43 | 101011 | 13 MPH |
| 44 | 101100 | 13 MPH |
| 45 | 101101 | 13 MPH |
| 46 | 101110 | 13 MPH |
| 47 | 101111 | 13 MPH |
| 48 | 110000 | 13 MPH |
| 49 | 110001 | 13 MPH |
| 50 | 110010 | 13 MPH |
| 51 | 110011 | 13 MPH |
| 52 | 110100 | 13 MPH |
| 53 | 110101 | 13 MPH |
| 54 | 110110 | 13 MPH |
| 55 | 110111 | 13 MPH |
| 56 | 111000 | 13 MPH |
| 57 | 111001 | 13 MPH |
| 58 | 111010 | 13 MPH |
| 59 | 111011 | 13 MPH |
| 60 | 111100 | 13 MPH |
| 61 | 111101 | 13 MPH |
| 62 | 111110 | 13 MPH |
| 63 | 111111 | 13 MPH |
| 64 | 1000000 | 13 MPH |
| 65 | 1000001 | 13 MPH |
| 66 | 1000010 | 13 MPH |
| 67 | 1000011 | 13 MPH |
| 68 | 1000100 | 13 MPH |
| 69 | 1000101 | 13 MPH |
| 70 | 1000110 | 13 MPH |
| 71 | 1000111 | 13 MPH |
| 72 | 1001000 | 13 MPH |
| 73 | 1001001 | 13 MPH |
| 74 | 1001010 | 13 MPH |
| 75 | 1001011 | 13 MPH |
| 76 | 1001100 | 13 MPH |
| 77 | 1001101 | 13 MPH |
| 78 | 1001110 | 13 MPH |
| 79 | 1001111 | 13 MPH |
| 80 | 1010000 | 13 MPH |
| 81 | 1010001 | 13 MPH |
| 82 | 1010010 | 13 MPH |
| 83 | 1010011 | 13 MPH |
| 84 | 1010100 | 13 MPH |
| 85 | 1010101 | 13 MPH |
| 86 | 1010110 | 13 MPH |
| 87 | 1010111 | 13 MPH |
| 88 | 1011000 | 13 MPH |
| 89 | 1011001 | 13 MPH |
| 90 | 1011010 | 13 MPH |
| 91 | 1011011 | 13 MPH |
| 92 | 1011100 | 13 MPH |
| 93 | 1011101 | 13 MPH |
| 94 | 1011110 | 13 MPH |
| 95 | 1011111 | 13 MPH |
| 96 | 1100000 | 13 MPH |
| 97 | 1100001 | 13 MPH |
| 98 | 1100010 | 13 MPH |
| 99 | 1100011 | 13 MPH |
| 100 | 1100100 | 13 MPH |
| 101 | 1100101 | 13 MPH |
| 102 | 1100110 | 13 MPH |
| 103 | 1100111 | 13 MPH |
| 104 | 1101000 | 13 MPH |
| 105 | 1101001 | 13 MPH |
| 106 | 1101010 | 13 MPH |
| 107 | 1101011 | 13 MPH |
| 108 | 1101100 | 13 MPH |
| 109 | 1101101 | 13 MPH |
| 110 | 1101110 | 13 MPH |
| 111 | 1101111 | 13 MPH |
| 112 | 1110000 | 13 MPH |
| 113 | 1110001 | 13 MPH |
| 114 | 1110010 | 13 MPH |
| 115 | 1110011 | 13 MPH |
| 116 | 1110100 | 13 MPH |
| 117 | 1110101 | 13 MPH |

A1:A501

| WEIGHT IN DECIMALS | WEIGHT IN BINARIES "off & on switches" | SPEED "minimum speed for deployment" |
|---|---|---|
| 118 | 1110110 | 13 MPH |
| 119 | 1110111 | 13 MPH |
| 120 | 1111000 | 13 MPH |
| 121 | 1111001 | 13 MPH |
| 122 | 1111010 | 13 MPH |
| 123 | 1111011 | 13 MPH |
| 124 | 1111100 | 13 MPH |
| 125 | 1111101 | 13 MPH |
| 126 | 1111110 | 13 MPH |
| 127 | 1111111 | 13 MPH |
| 128 | 10000000 | 13 MPH |
| 129 | 10000001 | 13 MPH |
| 130 | 10000010 | 13 MPH |
| 131 | 10000011 | 13 MPH |
| 132 | 10000100 | 13 MPH |
| 133 | 10000101 | 13 MPH |
| 134 | 10000110 | 13 MPH |
| 135 | 10000111 | 13 MPH |
| 136 | 10001000 | 13 MPH |
| 137 | 10001001 | 13 MPH |
| 138 | 10001010 | 13 MPH |
| 139 | 10001011 | 13 MPH |
| 140 | 10001100 | 13 MPH |
| 141 | 10001101 | 13 MPH |
| 142 | 10001110 | 13 MPH |
| 143 | 10001111 | 13 MPH |
| 144 | 10010000 | 13 MPH |
| 145 | 10010001 | 13 MPH |
| 146 | 10010010 | 13 MPH |
| 147 | 10010011 | 13 MPH |
| 148 | 10010100 | 13 MPH |
| 149 | 10010101 | 13 MPH |
| 150 | 10010110 | 13 MPH |
| 151 | 10010111 | 13 MPH |
| 152 | 10011000 | 13 MPH |
| 153 | 10011001 | 13 MPH |
| 154 | 10011010 | 13 MPH |
| 155 | 10011011 | 13 MPH |
| 156 | 10011100 | 13 MPH |
| 157 | 10011101 | 13 MPH |
| 158 | 10011110 | 13 MPH |
| 159 | 10011111 | 13 MPH |
| 160 | 10100000 | 13 MPH |
| 161 | 10100001 | 13 MPH |
| 162 | 10100010 | 13 MPH |
| 163 | 10100011 | 13 MPH |
| 164 | 10100100 | 13 MPH |
| 165 | 10100101 | 13 MPH |
| 166 | 10100110 | 13 MPH |
| 167 | 10100111 | 13 MPH |
| 168 | 10101000 | 13 MPH |
| 169 | 10101001 | 13 MPH |
| 170 | 10101010 | 13 MPH |
| 171 | 10101011 | 13 MPH |
| 172 | 10101100 | 13 MPH |
| 173 | 10101101 | 13 MPH |
| 174 | 10101110 | 13 MPH |
| 175 | 10101111 | 13 MPH |
| 176 | 10110000 | 13 MPH |
| 177 | 10110001 | 13 MPH |
| 178 | 10110010 | 13 MPH |
| 179 | 10110011 | 13 MPH |
| 180 | 10110100 | 13 MPH |
| 181 | 10110101 | 13 MPH |
| 182 | 10110110 | 13 MPH |
| 183 | 10110111 | 13 MPH |
| 184 | 10111000 | 13 MPH |
| 185 | 10111001 | 13 MPH |
| 186 | 10111010 | 13 MPH |
| 187 | 10111011 | 13 MPH |
| 188 | 10111100 | 13 MPH |
| 189 | 10111101 | 13 MPH |
| 190 | 10111110 | 13 MPH |
| 191 | 10111111 | 13 MPH |
| 192 | 11000000 | 13 MPH |
| 193 | 11000001 | 13 MPH |
| 194 | 11000010 | 13 MPH |
| 195 | 11000011 | 13 MPH |
| 196 | 11000100 | 13 MPH |
| 197 | 11000101 | 13 MPH |
| 198 | 11000110 | 13 MPH |
| 199 | 11000111 | 13 MPH |
| 200 | 11001000 | 13 MPH |
| 201 | 11001001 | 13 MPH |
| 202 | 11001010 | 13 MPH |
| 203 | 11001011 | 13 MPH |
| 204 | 11001100 | 13 MPH |
| 205 | 11001101 | 13 MPH |
| 206 | 11001110 | 13 MPH |
| 207 | 11001111 | 13 MPH |
| 208 | 11010000 | 13 MPH |
| 209 | 11010001 | 13 MPH |
| 210 | 11010010 | 13 MPH |
| 211 | 11010011 | 13 MPH |
| 212 | 11010100 | 13 MPH |
| 213 | 11010101 | 13 MPH |
| 214 | 11010110 | 13 MPH |
| 215 | 11010111 | 13 MPH |
| 216 | 11011000 | 13 MPH |
| 217 | 11011001 | 13 MPH |
| 218 | 11011010 | 13 MPH |
| 219 | 11011011 | 13 MPH |
| 220 | 11011100 | 13 MPH |
| 221 | 11011101 | 13 MPH |
| 222 | 11011110 | 13 MPH |
| 223 | 11011111 | 13 MPH |
| 224 | 11100000 | 13 MPH |
| 225 | 11100001 | 13 MPH |
| 226 | 11100010 | 13 MPH |
| 227 | 11100011 | 13 MPH |
| 228 | 11100100 | 13 MPH |
| 229 | 11100101 | 13 MPH |
| 230 | 11100110 | 13 MPH |
| 231 | 11100111 | 13 MPH |
| 232 | 11101000 | 13 MPH |
| 233 | 11101001 | 13 MPH |
| 234 | 11101010 | 13 MPH |
| 235 | 11101011 | 13 MPH |
| 236 | 11101100 | 13 MPH |
| 237 | 11101101 | 13 MPH |
| 238 | 11101110 | 13 MPH |
| 239 | 11101111 | 13 MPH |
| 240 | 11110000 | 13 MPH |
| 241 | 11110001 | 13 MPH |
| 242 | 11110010 | 13 MPH |
| 243 | 11110011 | 13 MPH |
| 244 | 11110100 | 13 MPH |
| 245 | 11110101 | 13 MPH |
| 246 | 11110110 | 13 MPH |
| 247 | 11110111 | 13 MPH |
| 248 | 11111000 | 13 MPH |
| 249 | 11111001 | 13 MPH |
| 250 | 11111010 | 13 MPH |
| 251 | 11111011 | 13 MPH |
| 252 | 11111100 | 13 MPH |
| 253 | 11111101 | 13 MPH |
| 254 | 11111110 | 13 MPH |
| 255 | 11111111 | 13 MPH |
| 256 | 100000000 | 13 MPH |
| 257 | 100000001 | 13 MPH |
| 258 | 100000010 | 13 MPH |
| 259 | 100000011 | 13 MPH |
| 260 | 100000100 | 13 MPH |
| 261 | 100000101 | 13 MPH |
| 262 | 100000110 | 13 MPH |
| 263 | 100000111 | 13 MPH |
| 264 | 100001000 | 13 MPH |
| 265 | 100001001 | 13 MPH |

-continued

A1:A501

| WEIGHT IN DECIMALS | WEIGHT IN BINARIES "off & on switches" | SPEED "minimum speed for deployment" |
|---|---|---|
| 266 | 100001010 | 13 MPH |
| 267 | 100001011 | 13 MPH |
| 268 | 100001100 | 13 MPH |
| 269 | 100001101 | 13 MPH |
| 270 | 100001110 | 13 MPH |
| 271 | 100001111 | 13 MPH |
| 272 | 100010000 | 13 MPH |
| 273 | 100010001 | 13 MPH |
| 274 | 100010010 | 13 MPH |
| 275 | 100010011 | 13 MPH |
| 276 | 100010100 | 13 MPH |
| 277 | 100010101 | 13 MPH |
| 278 | 100010110 | 13 MPH |
| 279 | 100010111 | 13 MPH |
| 280 | 100011000 | 13 MPH |
| 281 | 100011001 | 13 MPH |
| 282 | 100011010 | 13 MPH |
| 283 | 100011011 | 13 MPH |
| 284 | 100011100 | 13 MPH |
| 285 | 100011101 | 13 MPH |
| 286 | 100011110 | 13 MPH |
| 287 | 100011111 | 13 MPH |
| 288 | 100100000 | 13 MPH |
| 289 | 100100001 | 13 MPH |
| 290 | 100100010 | 13 MPH |
| 291 | 100100011 | 13 MPH |
| 292 | 100100100 | 13 MPH |
| 293 | 100100101 | 13 MPH |
| 294 | 100100110 | 13 MPH |
| 295 | 100100111 | 13 MPH |
| 296 | 100101000 | 13 MPH |
| 297 | 100101001 | 13 MPH |
| 298 | 100101010 | 13 MPH |
| 299 | 100101011 | 13 MPH |
| 300 | 100101100 | 13 MPH |
| 301 | 100101101 | 13 MPH |
| 302 | 100101110 | 13 MPH |
| 303 | 100101111 | 13 MPH |
| 304 | 100110000 | 13 MPH |
| 305 | 100110001 | 13 MPH |
| 306 | 100110010 | 13 MPH |
| 307 | 100110011 | 13 MPH |
| 308 | 100110100 | 13 MPH |
| 309 | 100110101 | 13 MPH |
| 310 | 100110110 | 13 MPH |
| 311 | 100110111 | 13 MPH |
| 312 | 100111000 | 13 MPH |
| 313 | 100111001 | 13 MPH |
| 314 | 100111010 | 13 MPH |
| 315 | 100111011 | 13 MPH |
| 316 | 100111100 | 13 MPH |
| 317 | 100111101 | 13 MPH |
| 318 | 100111110 | 13 MPH |
| 319 | 100111111 | 13 MPH |
| 320 | 101000000 | 13 MPH |
| 321 | 101000001 | 13 MPH |
| 322 | 101000010 | 13 MPH |
| 323 | 101000011 | 13 MPH |
| 324 | 101000100 | 13 MPH |
| 325 | 101000101 | 13 MPH |
| 326 | 101000110 | 13 MPH |
| 327 | 101000111 | 13 MPH |
| 328 | 101001000 | 13 MPH |
| 329 | 101001001 | 13 MPH |
| 330 | 101001010 | 13 MPH |
| 331 | 101001011 | 13 MPH |
| 332 | 101001100 | 13 MPH |
| 333 | 101001101 | 13 MPH |
| 334 | 101001110 | 13 MPH |
| 335 | 101001111 | 13 MPH |
| 336 | 101010000 | 13 MPH |
| 337 | 101010001 | 13 MPH |
| 338 | 101010010 | 13 MPH |
| 339 | 101010011 | 13 MPH |
| 340 | 101010100 | 13 MPH |
| 341 | 101010101 | 13 MPH |
| 342 | 101010110 | 13 MPH |
| 343 | 101010111 | 13 MPH |
| 344 | 101011000 | 13 MPH |
| 345 | 101011001 | 13 MPH |
| 346 | 101011010 | 13 MPH |
| 347 | 101011011 | 13 MPH |
| 348 | 101011100 | 13 MPH |
| 349 | 101011101 | 13 MPH |
| 350 | 101011110 | 13 MPH |
| 351 | 101011111 | 13 MPH |
| 352 | 101100000 | 13 MPH |
| 353 | 101100001 | 13 MPH |
| 354 | 101100010 | 13 MPH |
| 355 | 101100011 | 13 MPH |
| 356 | 101100100 | 13 MPH |
| 357 | 101100101 | 13 MPH |
| 358 | 101100110 | 13 MPH |
| 359 | 101100111 | 13 MPH |
| 360 | 101101000 | 13 MPH |
| 361 | 101101001 | 13 MPH |
| 362 | 101101010 | 13 MPH |
| 363 | 101101011 | 13 MPH |
| 364 | 101101100 | 13 MPH |
| 365 | 101101101 | 13 MPH |
| 366 | 101101110 | 13 MPH |
| 367 | 101101111 | 13 MPH |
| 368 | 101110000 | 13 MPH |
| 369 | 101110001 | 13 MPH |
| 370 | 101110010 | 13 MPH |
| 371 | 101110011 | 13 MPH |
| 372 | 101110100 | 13 MPH |
| 373 | 101110101 | 13 MPH |
| 374 | 101110110 | 13 MPH |
| 375 | 101110111 | 13 MPH |
| 376 | 101111000 | 13 MPH |
| 377 | 101111001 | 13 MPH |
| 378 | 101111010 | 13 MPH |
| 379 | 101111011 | 13 MPH |
| 380 | 101111100 | 13 MPH |
| 381 | 101111101 | 13 MPH |
| 382 | 101111110 | 13 MPH |
| 383 | 101111111 | 13 MPH |
| 384 | 110000000 | 13 MPH |
| 385 | 110000001 | 13 MPH |
| 386 | 110000010 | 13 MPH |
| 387 | 110000011 | 13 MPH |
| 388 | 110000100 | 13 MPH |
| 389 | 110000101 | 13 MPH |
| 390 | 110000110 | 13 MPH |
| 391 | 110000111 | 13 MPH |
| 392 | 110001000 | 13 MPH |
| 393 | 110001001 | 13 MPH |
| 394 | 110001010 | 13 MPH |
| 395 | 110001011 | 13 MPH |
| 396 | 110001100 | 13 MPH |
| 397 | 110001101 | 13 MPH |
| 398 | 110001110 | 13 MPH |
| 399 | 110001111 | 13 MPH |
| 400 | 110010000 | 13 MPH |
| 401 | 110010001 | 13 MPH |
| 402 | 110010010 | 13 MPH |
| 403 | 110010011 | 13 MPH |
| 404 | 110010100 | 13 MPH |
| 405 | 110010101 | 13 MPH |
| 406 | 110010110 | 13 MPH |
| 407 | 110010111 | 13 MPH |
| 408 | 110011000 | 13 MPH |
| 409 | 110011001 | 13 MPH |
| 410 | 110011010 | 13 MPH |
| 411 | 110011011 | 13 MPH |
| 412 | 110011100 | 13 MPH |
| 413 | 110011101 | 13 MPH |

-continued

A1:A501

| WEIGHT IN DECIMALS | WEIGHT IN BINARIES "off & on switches" | SPEED "minimum speed for deployment" |
|---|---|---|
| 414 | 110011110 | 13 MPH |
| 415 | 110011111 | 13 MPH |
| 416 | 110100000 | 13 MPH |
| 417 | 110100001 | 13 MPH |
| 418 | 110100010 | 13 MPH |
| 419 | 110100011 | 13 MPH |
| 420 | 110100100 | 13 MPH |
| 421 | 110100101 | 13 MPH |
| 422 | 110100110 | 13 MPH |
| 423 | 110100111 | 13 MPH |
| 424 | 110101000 | 13 MPH |
| 425 | 110101001 | 13 MPH |
| 426 | 110101010 | 13 MPH |
| 427 | 110101011 | 13 MPH |
| 428 | 110101100 | 13 MPH |
| 429 | 110101101 | 13 MPH |
| 430 | 110101110 | 13 MPH |
| 431 | 110101111 | 13 MPH |
| 432 | 110110000 | 13 MPH |
| 433 | 110110001 | 13 MPH |
| 434 | 110110010 | 13 MPH |
| 435 | 110110011 | 13 MPH |
| 436 | 110110100 | 13 MPH |
| 437 | 110110101 | 13 MPH |
| 438 | 110110110 | 13 MPH |
| 439 | 110110111 | 13 MPH |
| 440 | 110111000 | 13 MPH |
| 441 | 110111001 | 13 MPH |
| 442 | 111000100 | 13 MPH |
| 443 | 110111011 | 13 MPH |
| 444 | 110111100 | 13 MPH |
| 445 | 110111101 | 13 MPH |
| 446 | 110111110 | 13 MPH |
| 447 | 110111111 | 13 MPH |
| 448 | 111000000 | 13 MPH |
| 449 | 111000001 | 13 MPH |
| 450 | 111000010 | 13 MPH |
| 451 | 111000011 | 13 MPH |
| 452 | 111000100 | 13 MPH |
| 453 | 111000101 | 13 MPH |
| 454 | 111000110 | 13 MPH |
| 455 | 111000111 | 13 MPH |
| 456 | 111001000 | 13 MPH |
| 457 | 111001001 | 13 MPH |
| 458 | 111001010 | 13 MPH |
| 459 | 111001011 | 13 MPH |
| 460 | 111001100 | 13 MPH |

In deciding the speed at which the computer logic should respond to the occupant's weight value during collision, the decimal digital readings will be transformed into binaries. The transistorized switches (04) will then recognize the binaries as OFF and ON switches that represents "1s" and "0s". Where the 0s represents OFF signals and the 1s represent ON signals. The OFF is an opened circuit and the ON is a closed circuit. The above configuration is the weight values in decimal and binary representation of the OFF and ON electronic switching means. This switching means will logically enable communication to the computer system and effectively energize the active devices that will initiate a control energy that enables the smart deployment of the airbag (1) without causing any further injury to the occupant.

In addition, this advance and smart technology will incorporate the weight value of any occupant in order to fully protect the occupants with a controlled energy generated from the weight value of the occupant (110). The above weights show how long it will take the computer (500) to respond to the weights of the occupants by turning the switches ON and OFF and for the computer (500) to timely speed-up to the immediate response when a collision is sensed. The computer (500) uses logic functions to open and close all circuits with these switches. The logic depends on the switches to open and close on time for this intelligent device to know whom the occupant is by weight and to activate the deployment system for the airbags (1) that will deploy with a controlled energy according to the weight of the occupants. The weights are promptly transmitted to all the intelligent devices used in this invention in order to influence the controlled energy that enforces deployment that is totally dependant on the occupant's weight value.

It is now understood that the present invention is not limited to the sole embodiment described above, but encompasses any and all embodiments within the scope of the following claims.

I claim:

1. A safety system for an occupant in a vehicle, comprising:
   at least a seat disposed with a seat mounting structure affixed on a floor means of the vehicle;
   at least a weight sensor is secured between said seat mounting structure and the floor means, configured to measure the occupant's accurate weight when the vehicle is started and also while the vehicle is running;
   at least a supplemental restraint device comprising at least an air bag;
   configured to apply an amount of deployment force value in proportion to the occupant's weight measurement;
   at least a control module in communication with said supplemental restraint device for regulating at least said amount of deployment force value according to at least the measured occupant's weight;
   said weight sensor being further configured for determining the weight of the occupant seated on the seat and generating an output signal indicative thereof;
   at least a collision sensor in communication with said control module;
   said control module responsive to said weight sensor for controlling said supplemental restraint device, wherein the airbag is rendered of sufficient deployment force value to keep the occupant on said seat when a collision is sensed, but is not rendered of sufficient deployment force value to cause impact injury to the occupant;
   wherein said weight sensor further comprises load cells operatively configured with strain gauges and disposed between the seat mounting structure and the floor means of the vehicle; and
   wherein said weight sensor is in association with at least an accelerometer apparatus, wherein said accelerometer apparatus is further disposed with at least a mass selectively engaged with at least a crystal means, said crystal means responsive to at least a force corresponding to said measured weight and generating electrical energy across at least a surface thereof indicative of said airbag deployment force value.

2. The safety system of claim 1, wherein said control module is in communication with said weight sensor and said supplemental restraint device.

3. The safety system of claim 1, wherein said control module further comprises at least a processor.

4. The safety system of claim 1, wherein said air bag is configured to deploy at a speed and the deployment force value that are proportional to the occupant's weight.

5. The safety system of claim 1, further comprising means for detecting at least a rear end collision, in communication with said supplemental restraint device.

6. The safety system of claim 1, wherein said accelerometer apparatus is further operatively configured with said control module for calculating said amount of deployment force value for said air bag based upon at least the weight value of the seated occupant or at least a collision force value according to the vehicle speed.

7. The safety system of claim 1, wherein said control module further comprises a computer apparatus.

8. The safety system of claim 1, wherein said weight sensor is further structurally secured on a non elastic portion of the seat mounting structure.

9. The safety system of claim 1, wherein said control module is communicatively connected to said accelerometer apparatus.

10. The safety system of claim 1, wherein said control module is further configured to adjust said air bag deployment force value and at least a deployment speed based on the measured weight for at least the seated occupant on the seat.

11. The safety system of claim 1, wherein said weight sensor is further configured for taking weight measurements of at least the seated occupant and for converting at least a weight measurements into one or more electrical signals.

12. The safety system of claim 1, wherein said control module is further configured for receiving the measured weight of the seated occupant and for adjusting the air bag deployment force value and the airbag deployment speed for the seated occupant with at least a value that is proportionate to the weight measurement.

13. The safety system of claim 1, wherein said control module is further configured with said weight sensor and said collision sensor for adjusting the amount of deployment force value to keep the occupant on said seat.

14. The safety system of claim 1, further comprising at least an erasable programmable read only memory in communication with said weight sensor.

15. The safety system of claim 14, wherein said erasable programmable read only memory further comprising apparatus for correcting at least a weight data for at least a changing seated occupant on the seat.

16. The safety system of claim 14, wherein said erasable programmable read only memory is further operatively configured with said control module for monitoring the weight of at least the seated occupant on the seat; said erasable programmable read only memory correcting at least a weight data of at least a changing seated occupant on said seat.

* * * * *